United States Patent Office 3,235,551
Patented Feb. 15, 1966

3,235,551
NOVEL DERIVATIVES OF 2-AMINO-4H-5,6-DIHYDRO-1,3-THIAZINE
Hans Werner Schubert and Otto Behner, Wuppertal-Elberfeld, Friedrich Hoffmeister, Wuppertal-Vohwinkel, Horst Kreiskott, Wuppertal-Elberfeld, and Wulf Vater, Opladen, Germany, assignors to Farbenfabriken Bayer Aktiengesellschaft, Leverkusen, Germany, a corporation of Germany
No Drawing. Filed Sept. 24, 1963, Ser. No. 311,236
Claims priority, application Germany, Sept. 29, 1962, F 37,926
14 Claims. (Cl. 260—243)

This invention relates, in general, to new chemical compounds and involves the provision of novel derivatives of 2-amino-4H-5,6-dihydro-1,3-thiazine. More particularly, the invention is concerned with C-phenylated 2-amino-4H-5,6-dihydro-1,3-thiazines and the 2-N-acyl derivatives of the same, which are found to possess valuable utility as chemotherapeutic agents by reason of their surprisingly strong circulation-stimulating activity.

Thus, it has been known heretofore that 2-amino-4H-5,6-dihydro-1,3-thiazine, for example, possesses a weak blood pressure-elevating activity [cf. R. Voker, D. Krause, Tierarztl. Umschau (1954) 114; A. Schoberl and co-workers, A 614, 88 (1958)]. In contrast thereto, the novel 2-amino-4H-5,6-dihydro-6-phenyl-1,3-thiazine derivative of the present invention, for example, exhibits on the dog, following intravenous injection of only 0.5 mg./kg., a long-lasting blood pressure-raising effect in combination with a distinct increase in the blood supply to the coronary system.

The novel 2-amino-4H-5,6-dihydro-C-phenyl-1,3-thiazine derivatives of the invention may be produced via several alternate syntheses, including—

(a) subjecting γ-thiocyanopropylamines, phenylated in the propyl radical, to the action of weakly alkaline agents; or
(b) Subjecting N-tert.-butyl-N'-γ-hydroxypropylthioureas, also phenylated in the propyl radical, to the action of acids; or
(c) Subjecting γ-halopropyl isothiocyanates, again phenylated in the propyl radical, to the action of ammonia or ammonia-yielding agents; or
(d) Subjecting C-phenylated 2-mercapto- or 2-alkyl-mercapto-4H-5,6-dihydro-1,3-thiazines to the action of ammonia or ammonia-yielding agents; or
(e) Heating γ-aminopropyl-isothiourea ether hydrohalides, phenylated in the propyl radical, to elevated temperatures; or
(f) Subjecting N-γ-hydroxypropyl-thioureas, phenylated in the propyl radical, or their N'-acyl derivatives to the action of acids; or
(g) Subjecting 1,3-dihalopropanes, phenylated in the propyl radical, to the action of thiourea.

The foregoing reaction mechanisms can be effected in aqueous, aqueous-alcoholic or alcoholic solution, as well as in aliphatic or aromatic solvents, or in the melt, the selection of a suitable solvent or diluent for any given reaction being based, in known manner, on the realtive stability and reactivity of the reaction components involved. The use of a solvent or diluent is generally found to be expedient, but not absolutely necessary.

The 2-amino-4H-5,6-dihydro-C-phenyl-1,3-thiazine derivatives produced via the above-enumerated syntheses may, if desired, be converted in known manner into their corresponding N-acyl derivatives which, as pointed out hereinabove, similarly exhibit the surprising circulation-stimulating activity of the C-phenyl derivatives of the invention.

The phenyl radicals substituted in the 4-, 5- or 6- positions of the 2-amino- or 2-acylamino-4H-5,6-dihydro-1,3-thiazines may themselves be either mono- or polysubstituted as, for example, with halogen, alkyl, aralkyl, aryl, hydroxy, alkoxy, mercapto, alkylmercapto, nitro, amino or acylamino radicals.

In general, the products of the invention constitute bases which can be employed for therapeutic administration via any of the conventional routes, either as such, or in the form of their salts with any acid.

It is believed that the invention may be best understood by reference to the following specific examples illustrating the application of the foregoing principles and procedures to the preparation of typical compounds of the invention via several of the alternate routes of synthesis described hereinbefore. In the latter connection, the reaction mechanisms utilized in the examples are graphically illustrated in the following several structural diagrams:

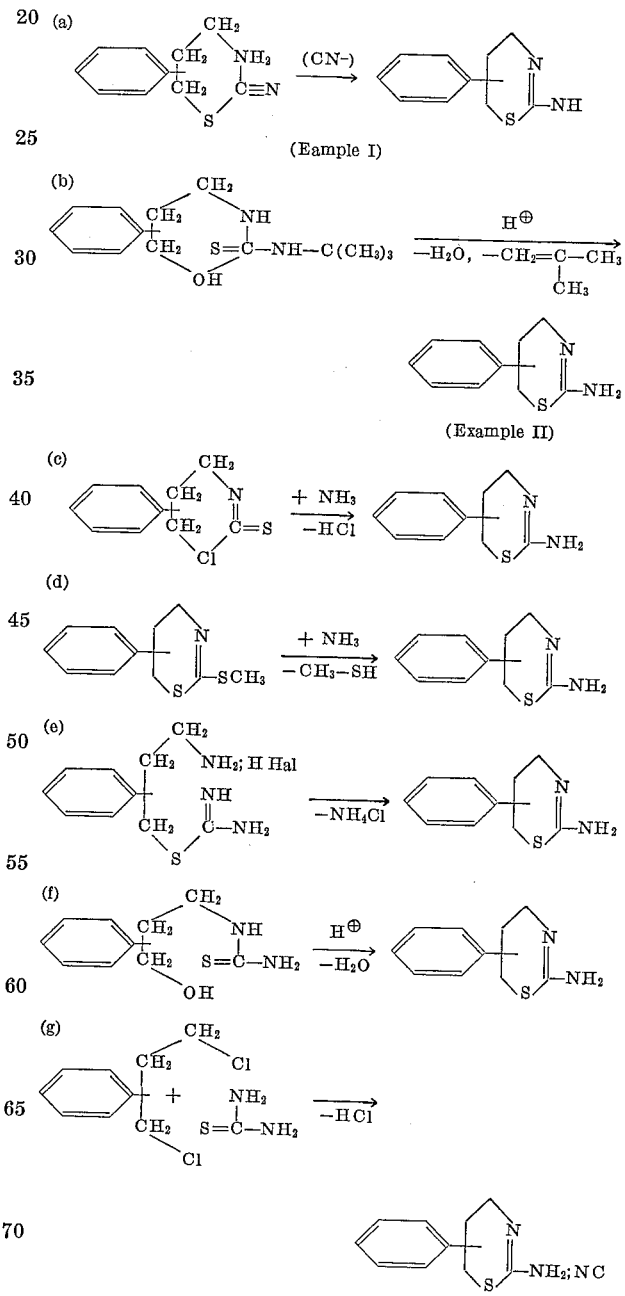

Example I (A) To a solution of 6.1 grams (0.094 mole) of potassium cyanide in 1.5 liters of water there was added dropwise in the course of 10 minutes a solution of 25.4 grams (0.094 mole) of 3-thiocyano-3-phenyl-propylamine hydrobromide in 380 cubic centimeters of water. The mixture was stirred overnight at room temperature, subsequently acidified with 48 percent hydrobromic acid and heated, with stirring, for 3 hours at 40° C. After 10 grams of active carbon had been added, the mixture was stirred for 2 more hours at 40° C., filtered, and the solution obtained was then evaporated under vacuum at 70° C. The slightly yellow solid residue was slurried with a little ice-cold water, filtered-off with suction and recrystallized from ethanol. The resulting 2-amino-4H-5,6-dihydro-6-phenyl-1,3-thiazine hydrobromide melts at 196° C. (Yield 18.5 grams, i.e. 73 percent of the theoretical.)

$C_{10}H_{13}BrN_2S$ (mol. weight=273.2)

|  | N | S |
|---|---|---|
| Calculated | 10.25 | 11.74 |
| Found | 9.83 | 11.38 |

The corresponding free base has the melting point 97–99° C., whereas the hydrochloride has the melting point 205–206° C.

The corresponding N-acetyl compound, prepared in the usual manner, melts at 155° C., and the hydrobromide of the N-propionyl compound at 216° C.

(B) In an analogous manner, the hydrobromide of 2-amino-4H-4-phenyl-5,6-dihydro-1,3-thiazine, having the melting point 180–183° C., was obtained from 1-phenyl-3-thiocyano-propylamino hydrobromide. The free base prepared therefrom has the melting point 108–110° C. $C_{10}H_{12}N_2S$ (mol. weight=192.3):

|  | C | H | N |
|---|---|---|---|
| Calculated | 62.47 | 6.29 | 14.57 |
| Found | 62.53 | 6.47 | 14.35 |

The corresponding hydrochloride has the melting point 159–162° C., whereas the hydrochloride of the N-acetyl derivative melts at 148–150° C.

In an analogous manner, the following compounds were produced:

(C) 2-amino-4H-4-(3'-chlorophenyl)-5,6-dihydro-1,3-thiazinehydrobromide; melting point 112–115° C.

(D) 2-amino-4H-4-(4'-chlorophenyl)-5,6-dihydro-1,3-thiazinehydrobromide; melting point 215–218° C.

(E) 2-amino-4H-4-(4'-methoxyphenyl)-5,6-dihydro-1,3-thiazinehydrochloride; melting point 210–213° C.

Example II

A mixture of 4.5 grams (0.03 mole) of 1-phenyl-3-aminopropanol-(1), 1.0 gram of sulphur flowers and 10 cubic centimeters of ethanol was heated, with stirring, to boiling, and a solution of 2.5 grams (0.03 mole) of tert.-butyl isocyanide in 10 cubic centimeters of ethanol was slowly added dropwise. The mixture was boiled for 15 minutes, the ethanol was then distilled off, the residue treated with 15 cubic centimeters concentrated hydrochloric acid, and then boiled under reflux for 30 minutes. After cooling, the product was diluted with water, the slightly turbid solution clarified with animal charcoal, the base freed from the filtrate by treating with a solution of potassium carbonate, while cooling with ice-water, and then taken up immediately in ether. By evaporating the ether solution which had been dried over potassium carbonate, the 2-amino-4H-5,6-dihydro-6-phenyl-1,3-thiazine described in Example I was obtained which melts, after recrystallizing from benzene-ligroin, at 97–99° C. and is identical with the free base obtained via the synthesis of Example I. (Yield 4 grams, i.e. 69.5 percent of the theoretical.)

In place of tert.-butyl isocyanide and flowers of sulphur, tert.-butyl isothiocyanate may be used with the same result.

Example III

Twelve (12) grams (0.043 mole) of 1-phenyl-1,3-dibromopropane and 3.3 grams (0.0435 mole) of thiourea were melted together for 4.5 hours at 140° C. (bath temperature), while a moderate current of nitrogen was passed thereover. Under strong evolution of hydrogen bromide, the melt which was at first thinly-liquid, turned gradually viscous and dark. After cooling, the melt was first boiled twice with ethyl acetate, then digested twice with 100 cubic centimeters of water each time on a water bath, and freed from black smears by filtration. By treating the aqueous solution with a sodium hydroxide solution, 4.7 grams of a crude product separated out which, after recrystallization from ligroin, was found to melt at 108–109° C. It is identical, according to melting point and mixed melting point, with the 2-amino-4H-4-phenyl-5,6-dihydro-1,3-thiazine (melting point 108–110° C.) obtained according to Example I.

Example IV

Five (5) grams of 1-phenyl-1-aminopropyl isourea ether hydrobromide (obtained by the action of thiourea in an alcoholic solution on 3-amino-3-phenyl-propyl-bromide hydrobromide; melting point 220–223° C.) were heated for 1 hour to 250° C. After cooling, the melt was extracted with water, the solution clarified with charcoal and rendered alkaline with sodium hydroxide solution. The precipitated base was taken up in ether and, after drying over potassium carbonate, precipitated therefrom with etheric HCl as hydrochloride. The hydrochloride thus obtained was found to be identical, according to melting point and the infra-red spectrum, with the 2-amino-4H-4-phenyl-5,6-dihydro-1,3-thiazine hydrochloride obtained according to the procedure of Example I.

Example V

To a solution of 21.2 grams (0.1 mole) of 3-chloro-1-phenyl-propyl isothiocyanate [produced from 3-chloro-1-phenyl-propylamine-(1)-hydrochloride, melting point 234–236° C. and thiophosgene in a water-ethylene chloride mixture at room temperature in the presence of $CaCO_3$, boiling point 101–103° C. at 0.01 mm. Hg, yield 88 percent of the theoretical] in 40 cubic centimeters of ethanol there was slowly adding dropwise at 0° C., a solution of 1.7 grams (0.1 mole) of $NH_3$ in ethanol. The mixture was then stirred for 2 hours at room temperature and for a further hour under reflux. After distilling off the ethanol it was dissolved in dilute hydrochloric acid, filtered-off from the matter insoluble in acid, the filtrate was then rendered alkaline with caustic soda while cooling with ice, extracted with ether, and the base finally recrystallized (after distilling off the ether) from benzene-ligroin. (Melting point=107–108° C.)

The compound was found to be identical with the 2-amino-4-phenyl-4H-5,6-dihydro-1,3-thiazine, produced according to the synthesis of Example I.

Example VI

2 - methylmercapto - 4 - (3 - chlorophenyl) - 5,6 - dihydro-4H-1,3-thiazine, in amount of 25.8 grams (0.1 mole), and 8.0 grams (0.15 mole) of ammonium chloride were well mixed and heated on the oil bath to 210° C. Splitting off of methylmercaptan took place, which was completed after about an hour. The reaction mixture was taken up in water after cooling and separated from insoluble components by shaking with ether. The base was then precipitated from the aqueous solution with caustic soda, taken up in ether and recrystallized from benzene-ligroin after distilling off the ether. (Melting point= 108–109.5° C.)

The compound was found to be identical with the base of the 2-amino-4-(3-chlorophenyl)-4H-5,6-dihydro-1,3-thiazine hydrobromide produced in accordance with the synthesis of Example I.

*Example VII*

Twenty-eight (28) grams (0.2 mole) of distilled benzoyl chloride were added dropwise without cooling to a suspension of 15.2 grams (0.2 mole) of ammonium thiocyanate in 50 cubic centimeters of absolute acetone. It was then stirred for 5 minutes under reflux. To this solution of benzoyl isothiocyanate cooled to room temperature, a solution was added dropwise consisting of 30.2 grams (0.2 mole) of 3-phenyl-3-amino-propanol-(1) in 50 cubic centimeters of absolute acetone, then stirred for one-half hour under reflux and the acetone distilled off. The residue was boiled with 70 cubic centimeters of concentrated hydrochloric acid and 35 cubic centimeters of water for an hour. It was diluted with cold water, filtered off from the precipitated benzoic acid (19 grams, melting point 123–124° C.), the filtrate was rendered alkaline with caustic soda and the precipitated base was then taken up in ether. Into the ether solution dried with potash, dry hydrogen chloride gas was then passed, whereby the crystalline hydrochloride came down. After recrystallizing from alcohol-ether, it was found to melt at 158.5–160° C.

This hydrochloride was found to be identical with the hydrochloride of the 2-amino-4-phenyl-4H-5,6-dihydro-1,3-thiazine produced according to the synthesis of Example I.

What is claimed is:

1. A member selected from the group consisting of a chemical compound represented by the formula:

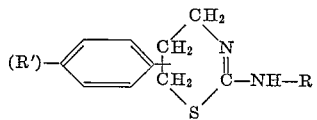

wherein R is a member selected from the group consisting of hydrogen and acetyl; and R', substituted on the phenyl ring-substituent, consists of at least one member selected from the group consisting of halogen, lower alkyl, hydroxy, lower alkoxy, mercapto, lower alkylmercapto, nitro, amino and lower carboxylic acid substituted amino; and a physiologically acceptable acid addition salt therefore.

2. The compound, 2-amino-4H-5,6-dihydro-6-phenyl-1,3-thiazine.

3. The compound, 2-amino-4H-5,6-dihydro-6-phenyl-1,3-thiazine-hydrobromide.

4. The compound, 2-amino-4H-5,6-dihydro-6-phenyl-1,3-thiazine-hydrochloride.

5. The compound 2-acetylamino-4H-5,6-dihydro-6-phenyl-1,3-thiazine.

6. The compound, 2-amino-4H-4-phenyl-5,6-dihydro-1,3-thiazine.

7. The compound, 2-amino-4H-4-phenyl-5,6-dihydro-1,3-thiazine-hydrochloride.

8. The compound 2-acetylamino- 4H-4-phenyl-5,6-dihydro-1,3-thiazine.

9. The compound, 2-amino-4H-4-(3'-chlorophenyl)-5,6-dihydro-1,3-thiazine.

10. The compound, 2-amino-4H-4-(3'-chlorophenyl)-5,6-dihydro-1,3-thiazine-hydrobromide.

11. The compound, 2-amino-4H-4-(4'-chlorophenyl)-5,6-dihydro-1,3-thiazine.

12. The compound, 2-amino-4H-4-(4'-chlorophenyl)-5,6-dihydro-1,3-thiazine-hydrobromide.

13. The compound, 2-amino-4H-4-(4'-methoxyphenyl)-5,6-dihydro-1,3-thiazine.

14. The compound, 2-amino-4H-4-(4'-methoxyphenyl)-5,6-dihydro-1,3-thiazine-hydrochloride.

References Cited by the Examiner

UNITED STATES PATENTS 3,137,628   6/1964   Meiser et al. _____ 260—243

FOREIGN PATENTS 752,003   7/1956   Great Britain.
634,272   3/1964   South Africa.

WALTER A. MODANCE, *Primary Examiner.*